(12) United States Patent
Orlandi

(10) Patent No.: US 6,476,759 B2
(45) Date of Patent: Nov. 5, 2002

(54) METHOD FOR THE CALIBRATION OF AN FM/CW TYPE RADIO ALTIMETER, AND RADIO ALTIMETER DESIGNED FOR THE IMPLEMENTATION OF THIS METHOD

(75) Inventor: Fabrice Orlandi, Massy (FR)

(73) Assignee: Thomson-CSF, Paris (FR)

( * ) Notice: Subject to any disclaimer, the term of this patent is extended or adjusted under 35 U.S.C. 154(b) by 20 days.

(21) Appl. No.: 09/750,170

(22) Filed: Dec. 29, 2000

(65) Prior Publication Data

US 2001/0013840 A1 Aug. 16, 2001

(30) Foreign Application Priority Data

Dec. 30, 1999 (FR) .............................................. 99 16768

(51) Int. Cl.[7] .................................................. G01S 7/40
(52) U.S. Cl. ........................ 342/122; 342/120; 342/174
(58) Field of Search ................................ 342/122, 120, 342/174; 367/99, 101, 102

(56) References Cited

U.S. PATENT DOCUMENTS

| | | | |
|---|---|---|---|
| 3,217,322 A | * 11/1965 | Kabell et al. ............... | 367/102 |
| 4,509,049 A | * 4/1985 | Haendel et al. ............. | 342/122 |
| 4,599,618 A | * 7/1986 | Haendel et al. ............. | 342/122 |
| 4,945,360 A | * 7/1990 | Trummer et al. ........... | 342/122 |
| 5,477,226 A | * 12/1995 | Hager et al. ................ | 342/122 |
| 5,757,311 A | 5/1998 | Voyce | |
| 5,963,509 A | * 10/1999 | Lindmuller et al. ........ | 367/102 |

FOREIGN PATENT DOCUMENTS

| DE | 197 13 9678 | 10/1998 |
| EP | 0 667 536 | 8/1995 |
| FR | 2 750 766 | 1/1998 |

OTHER PUBLICATIONS

A. Khanifar, et al. "Microwave scatterometry in support of space–borne scientific missions", Electronics & Communication Engineering Journal, vo. 6, No. 6, Dec. 1, 1994, pp. 281–288.

* cited by examiner

Primary Examiner—Ian J. Lobo
(74) Attorney, Agent, or Firm—Oblon, Spivak, McClelland, Maier & Neustadt, P.C.

(57) ABSTRACT

A radio altimeter using a linear oscillator to transmit a saw-toothed signal comprises, in addition to this first oscillator, a second linear oscillator to transmit, in synchronism with the first linear oscillator, another saw-toothed signal with a given saw-tooth duration Td. The plateau of the sawteeth of the two saw-toothed signals are at a distance from each other equal to a value f. The test consists in obtaining a height h' by beats between the two saw-toothed signals and computing a standard height $he = f.c.Td/dF.2$ where c is the speed of light and dF the duration of each saw-tooth of the other signal. Application to all FM/CW radio altimeters.

12 Claims, 2 Drawing Sheets

METHOD FOR THE CALIBRATION OF AN FM/CW TYPE RADIO ALTIMETER, AND RADIO ALTIMETER DESIGNED FOR THE IMPLEMENTATION OF THIS METHOD

BACKGROUND OF THE INVENTION

Field of the Invention

The invention relates to FM/CW or "frequency modulation/continuous wave" type radio altimeters. These radio altimeters periodically send out a continuous wave, linearly modulated in frequency between two boundary values, in other words, a saw-toothed wave. When this wave is received by the radio altimeter after being reflected by the ground, it has a delay 2h/c with respect to the wave sent, where h is the height of the radio altimeter from the ground and c is the speed of light. Since the modulation is linear, this delay is proportional to the beat frequency, f, obtained by the mixing of the transmission signal and the reception signal. If we know the difference dF between the two boundary values and the duration Td taken by the modulation to pass from one boundary value to the other, it is then possible to compute the height h by the formula:

$$h = Td*f*c/(2*dF)$$

DISCUSSION OF THE BACKGROUND

Description of the Prior Art

In reality, the mixture of the waves sent and received does not give the beat frequency alone but an entire spectrum of frequencies. The different methods used to process these frequencies makes it possible to extract the frequency representing the height to be measured. A method of this kind is. described, for example, in the French patent No. 2 750 766.

However, in these prior art radio altimeters, there is no means, apart. of the use of a test stand, of performing a calibration to ascertain that the measurements made by the radio altimeter are precise. Now, it would be valuable to be able to make this verification, and to do so even during the working of the radio altimeter.

The present invention is aimed at proposing a method which, for the cost of a relatively minor adaptation of the electronic circuitry of the radio altimeter, enables precise calibration at all times.

This is obtained by the production, in the radio altimeter, in addition to the transmission signal, of a pseudo reception signal and by the checking of the value of the pseudo-height measured by the radio altimeter with reference to this pseudo-signal.

SUMMARY OF THE INVENTION

For this purpose, the invention proposes a method of calibration designed for an FM/CW type radio altimeter comprising a linear oscillator to give a saw-toothed signal, with a link to a transmitting antenna, a mixer circuit with two links respectively towards the oscillator and towards a receiving antenna, and a processing device to process the output signals from the mixer circuit, wherein the method consists in:

injecting an auxiliary saw-toothed signal with a given saw-tooth slope, Td/dF, into the link between the receiving antenna and the mixer, the sawteeth of this signal being synchronous with those of the linear oscillator, and the plateau of the sawteeth of this signal being offset with respect to the plateau of the sawteeth of the linear oscillator by a given value f, obtaining, by modification or non-modification of the duration of modulation of the sawteeth of the linear oscillator or the dF of the linear oscillator, of a beat at the frequency f between the sawteeth of the oscillator and of the auxiliary signal so that the processing device gives a measured height h', and comparing this measured height with the standard height obtained by computation according to the formula $h = f*c*Td/(dF*2)$, where c is the speed of light.

The invention also proposes an FM/CW type radio altimeter comprising, firstly, in series, a control device, a linear oscillator and first coupling elements to couple the oscillator to a transmitting antenna and, secondly, a mixer circuit with a first input coupled to the linear oscillator and a second input, second coupling elements to couple a receiving antenna to the second input of the mixer circuit and a processing device to process the output signals from the mixer circuit wherein, to perform a calibration of the radio altimeter, it comprises an auxiliary linear oscillator and a directional coupler connected in series, the auxiliary oscillator being controlled by the control device and the coupler being inserted into the second coupling elements.

BRIEF DESCRIPTION OF THE DRAWINGS

The present invention will be understood more clearly and other features shall appear from the following description and from the figures pertaining thereto, of which.

DESCRIPTION OF THE PREFERRED EMBODIMENT

Figure 1:
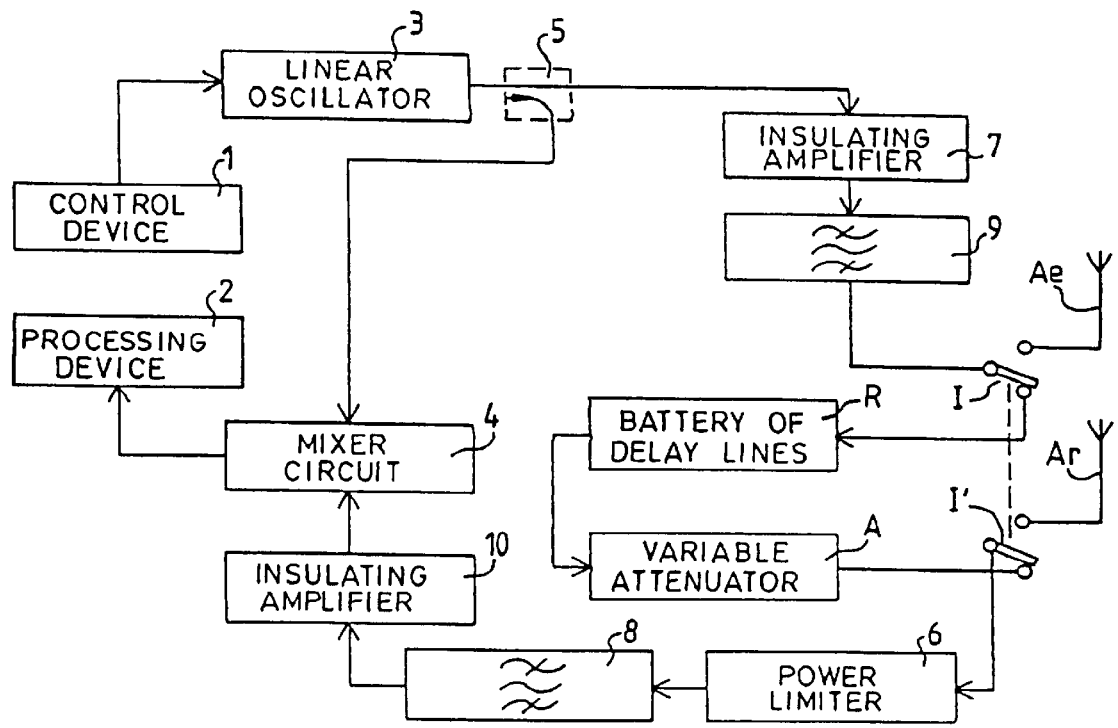
FIG. 1 shows a prior art radio altimeter.
Figure 3:
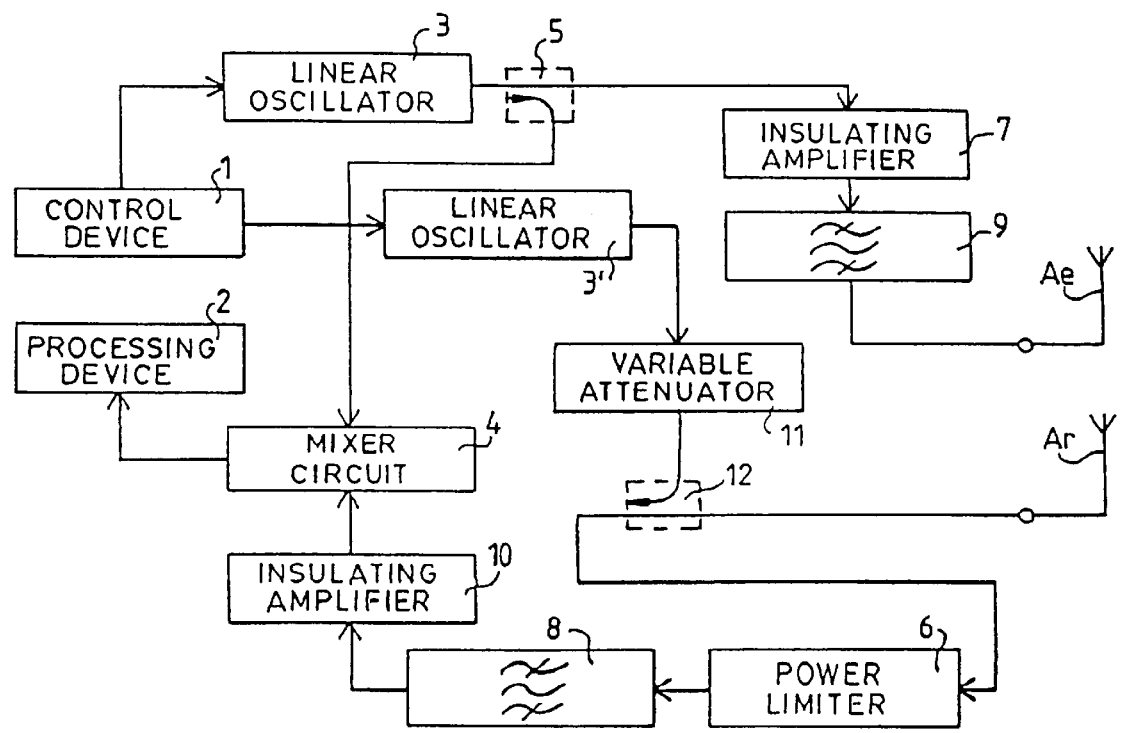

In FIGS. 1 and 3 on the one hand and 2, 4, 5 and 6 on the other hand. the corresponding elements are designated by the same references.

FIG. 1 shows a prior art radio altimeter. This radio altimeter has a control device 1 and a processing device 2 whose functions are carried out by means of a microprocessor. The control device 1 controls a linear oscillator, 3 whose output signal is given to a directional coupler 5 which, in the example described, is a 20 dB coupler. The coupler 5 transmits the major part of the energy that it receives to an insulating amplifier 7 followed by a bandpass filter 9 and the remainder of the energy that it receives to the first input of a mixer circuit 4 whose output signals are given to the processing device 2. A transmitting antenna Ae is coupled to the output of the filter 9 through the first disk I of a double two-position selector switch 11'.

The radio altimeter according to FIG. 1 is connected to a receiving antenna Ar and this antenna is coupled to the second input of the mixer circuit 4 by the following elements in series: the second disk I' of the double selector switch, a power limiter 6, a bandpass filter 8 and an insulating amplifier 10.

In the case of the example described with reference to FIG. 1, the linear oscillator is controlled to give a signal whose frequency varies in saw-toothed form from a value F1 to a value F2, with a plateau at the low frequency, F1.

Figure 2:
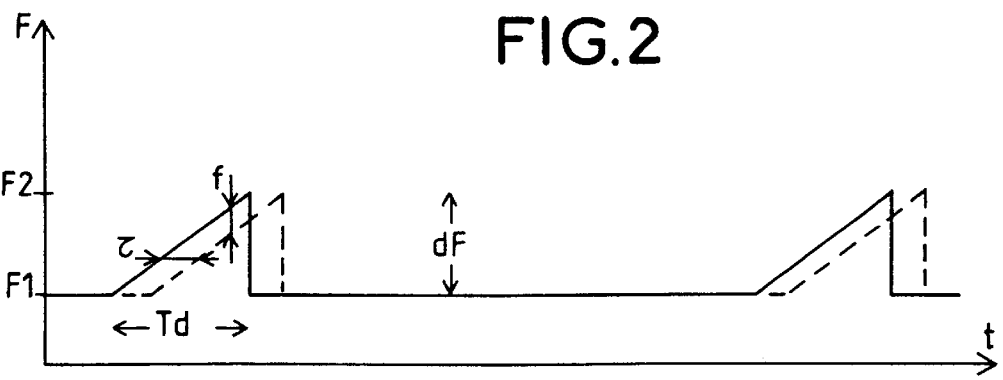
FIG. 2 is a graph pertaining to the waves sent and received by the radio altimeters described in this document, FIG. 3 show a radio altimeter according to the invention.

FIG. 2 is a graph in which an unbroken line represents the variation in time of the frequency of the wave sent by the radio altimeter of FIG. 1 and dashes represent the variation in time of frequency of the wave reflected by the ground and received by the receiving antenna Ar. The second curve corresponds to the first but is offset by the time τ taken by the wave to make a to-and-fro journey with reflection on the ground. As indicated at the beginning of this document, the height measured by the radio altimeter is given by the formula $$h=Td*f*c/(2*dF)$$

in which the variables Td, f and dF are referenced in FIG. 2: Td is the duration of one saw-tooth, namely the duration of modulation, f is the beat frequency between the wave sent and the wave reflected by the ground, dF is the bandwidth of frequencies travelled by the sawteeth.

In the example described, the linear oscillator 3, while keeping a constant width dF for the frequency band travelled by the sawteeth, is programmed to have saw-tooth durations Td such that the beat frequencies due to the reflected waves occur inside the frequency band in which the processing device makes its measurement. In the example described, this band extends from 40 to 110 kHz and the beat frequencies are brought to 85 kHz. For this type of operation, the slope dF/Td of the saw-tooth is modified gradually by obtaining a variation in Td, until the beat frequencies due to the transmission channel occur between 40 and 100 kHz. Then they are brought to 85 kHz where they are studied.

With a radio altimeter like that of FIG. 1, to verify that the measured heights are exact, there is a known method of using a test stand consisting, as shown in FIG. 1, of a battery of delay lines, R, followed by a variable attenuator A. The double selector switch I' has been drawn in FIG. 1 to show that, during a calibration test, the antennas are disconnected and that the output of the filter 9 is connected, through the battery of delay lines and the attenuator, to the input of the power limiter 6. In general, this selector switch does not exist and the test is performed by manually disconnecting the antennas to replace them by the elements R and A. The calibration consists in verifying that the heights indicated by the radio altimeter are precise. For this purpose, a signal is usually sent. However, instead of reaching the second input of the mixer circuit 4 by passing through the antenna Ae, a ground reflection and the antenna Ar, this signal reaches this second input by passing through one of the delay lines of the battery of delay lines R. The lines of the battery R are lines whose delay is known with precision. If, therefore, r is the delay caused by that one line which is used to perform the calibration, the value of the height hm measured by the radio altimeter must be equal to the computed value hc:

$$hc=r*c/2.$$

This equation is obtained, starting from the equation h=Td*f*c/(2*dF) seen further above, in taking account of the equality f/τ=dF/Td which is deduced from FIG. 2 and in replacing τ by r in this equality, giving f=dF*r/Td. If hm is different from hc, the value hm is corrected and either the values that the radio altimeter subsequently gives are corrected proportionally or several values are measured and computed with different delay lines, and the values that the radio altimeter subsequently gives are corrected by extrapolation. It must be noted however that, if the values measured differ far too much from the values computed as a function of the values of the delays of the delay lines used, then a search must be made for a drift or even a loss of adjustment of the radio altimeter. These test stands have imperfections and even defects which, in the spectrum of the signal given by the mixer circuit 4, add parasitic lines to the line produced by the beat between the sent wave and the wave reflected by the ground vertically to the radio altimeter.

FIG. 3 shows how to modify the radio altimeter of FIG. 1 to perform a calibration without the test stand formed by the elements R and A and with the selector switch 11' replaced by short-circuits between, on the one hand, the filter 9 and the antenna Ae and, on the other hand, the antenna Ar and the power limiter 6.

The modification consists of the addition of two series-connected elements: an auxiliary linear oscillator, 3', controlled by the control device 1, and a directional coupler 12 which, in the example described, is a 20 dB coupler. The coupler 12 is inserted between the antenna Ar and the power limiter 6. It sends the limiter 6 the major part of the energy that it receives from the oscillator 3'. Furthermore, a variable attenuator 11 may be inserted between the elements 3' and 12 in order to test the sensitivity of the radio altimeter.

With the radio altimeter thus modified, the calibration is performed in successive steps as follows:

1. The preliminary measurement, by the radio altimeter, of the height hs from the ground; when this value is obtained, the oscillator 3 delivers sawteeth with a certain duration of modulation, hereinafter referenced Tds: the auxiliary oscillator 3' is not in operation during this measurement which is therefore a conventional measurement.

2. The choice of a duration Tde of modulation of the oscillator 3' that is different from Tds which, as described hereinafter, enables the computation of a standard height he which is a fictitious height different from hs; this choice is dictated, in the following steps, by a problem of separation of the beat frequencies, some caused by the signals coming from the antenna Ar while others are caused by the signals coming from the auxiliary oscillator 3'; for the calibration operation described here below, it will be assumed that the standard height chosen, he, is the height obtained with the saw-tooth width equal to Tds/4.

3. The putting into operation of the auxiliary oscillator 3' with a saw-toothed signal whose sawteeth are in synchronism with the sawteeth of the oscillator 3, for which the frequency sweep of the sawteeth, dFe, is preferably, though not indispensably, the same as it is for the oscillator 3 but with a plateau of the sawteeth that is offset downwards or upwards by a value hereinafter referenced f'. In the example described, the offset is 85 kHz downwards—the duration of modulation Tde of the sawteeth of the auxiliary oscillator is taken to be equal to Tds/4 where Tds is, as indicated further above, the duration of modulation of the sawteeth of the oscillator 3 when the measurement according to the first step was obtained.

Figure 4:
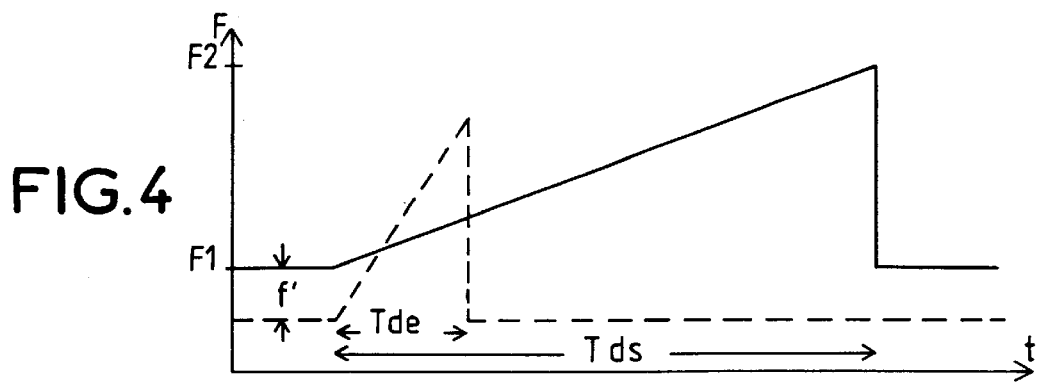
FIGS. 4 to 6 are graphs pertaining to the radio altimeter according to FIG. 3.

FIG. 4 is a graph representing the saw-toothed signal referred to here above, in an unbroken line for the oscillator 3 and dashes for the oscillator 3'

Figure 5:
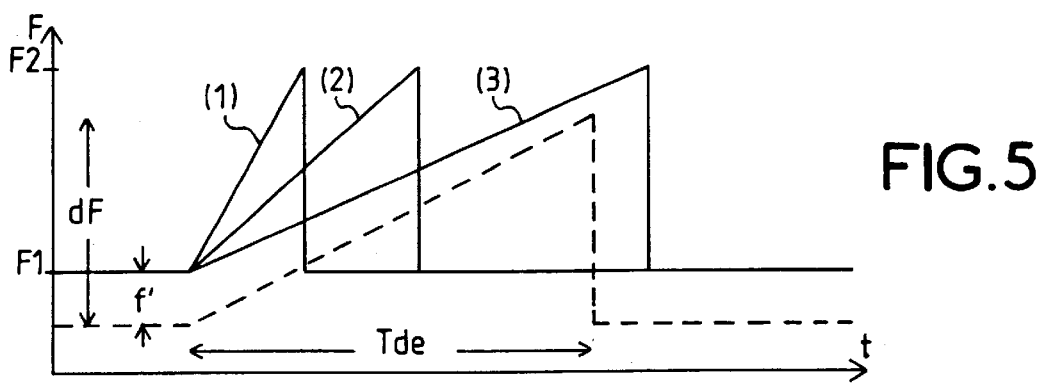

4. The duration of modulation Tde of the sawteeth of the auxiliary oscillator 3' is kept fixed while that of the oscillator 3 is increased by leaps of 2, starting from a value that is very low as compared with Tde, and this is done until, by beats with the oscillator 3 signal, a signal is obtained in the analysis window which, as seen here above, goes from 40 to 110 kHz in the example described. Throughout the duration of the test, the analysis window is open only when the sawteeth of the auxiliary and main oscillator overlap, FIG. 5 illustrates this search showing, in dashes, the signal of the auxiliary oscillator 3' and, in solid lines, three successive signals (1), (2), (3) delivered by the oscillator 3; the third signal (3) is the one that gives a beat in the analysis window. It must be noted that, in FIGS. 5 and 6, the scale of the time values has been multiplied by three with respect to FIG. 4 in order to make the graphs clearer.

Figure 6:
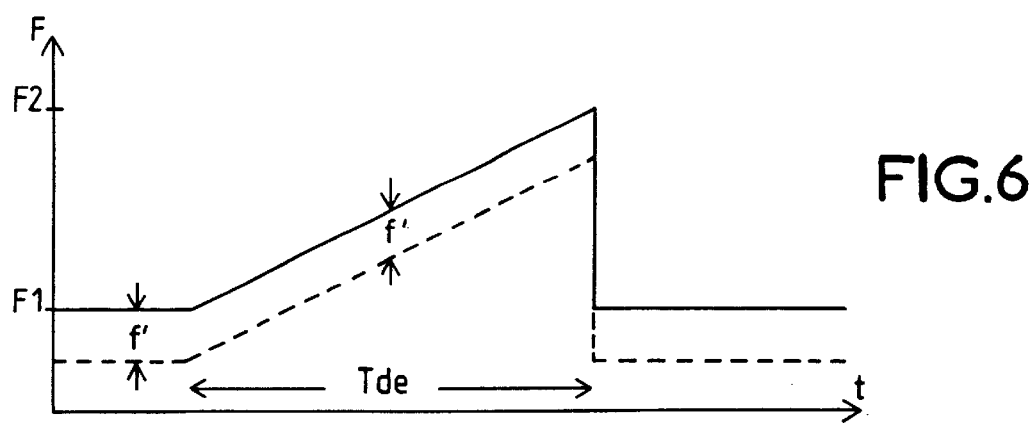

5. The width of the sawteeth of the oscillator 3 is adjusted so that the beat takes place at 85 kHz in the measurement window. A measurement h' is given by the radio altimeter, FIG. 6 illustrates this adjustment. The figure again shows the signal of the oscillator 3 in an unbroken line and the signal of the auxiliary oscillator 3' in dashes 6. The processing device knows the value f and Tde/dFe which are values dictated by the control device 1. The standard height chosen is computed according to he=Tde*f*c/(2*dFe). The value h' is compared with this standard value he. If h' is different from he a correction may be applied to the radio altimeter as indicated further above, according to the prior art, namely by a coefficient of proportionality or by extrapolation if at least two calibration operations are performed. It is understood that if a measurement h' given by the radio altimeter differs excessively from the corresponding standard height, a search for a drift or even a loss of adjustment of the radio altimeter must be made in order to remedy the problem.

It must be noted that the calibration can be done with periods of modulation Tde of the calibration saw-tooth smaller than the period Tds obtained during the preliminary measurement of the distance from the ground, as well as with periods greater than Tds. All that is needed is that the processing device 2 should be able to distinguish between the beats due to the signal reflected by the ground and the beats coming from the auxiliary oscillator. Tde therefore should not be too close to Tds. Furthermore, to facilitate the search for the beats due to the signal coming from the auxiliary oscillator, it is preferable, in the step 4, to avoid encountering beats due to the signal reflected by the ground. This is why, in the example described, where Tde is smaller than Tds, the fourth step is done in increasing the duration of modulation of the oscillator 3, whereas if Tde has been chosen to be greater than Tds, the fourth step would have begun with a duration of modulation of the oscillator 3 greater than Tds and then this duration of modulation of the oscillator 3 would have been gradually reduced.

It must be noted that, when the frequency sweeps of the two oscillators 3, 3' are equal as well as when they are different, the slope value Td/dF is, after adjustment of the oscillator 3, the same for both oscillators, and that it is this value that enters into the computation of the standard height: h=f*c*Td/(dF*2).

This principle remains valid for all FW/W radio altimeter systems. Depending on the principle of operation, the difference in frequency fe between the two oscillators or again the frequency sweep dFe will be adjusted in order to obtain the desired height for calibration.

The radio altimeter according to FIG. 3 can also be used to conduct tests of sensitivity. For this purpose, while the variable attenuator 11 has an attenuation coefficient of 1 and the radio altimeter has detected the beat due to the auxiliary oscillator, the attenuation coefficient is reduced so that it tends towards 0 and the value that it shows, when the beat signal due to the oscillator disappears, is a value of measurement of sensitivity.

In other words, to perform a test of sensitivity of the radio altimeter, it consists, when the beat at the frequency f has been found, in suddenly reducing and then gradually increasing the amplitude of the auxiliary signal until the radio altimeter is again able to give the measured height h'.

What is claimed is:

1. A method of calibration designed for an FM/CW type radio altimeter, comprising:

injecting an auxiliary saw-toothed signal with a given saw-tooth slope, Td/dF, into a link between a receiving antenna and a mixer, sawteeth of the auxiliary saw-toothed signal being synchronous with sawteeth of a signal produced by a linear oscillator, with a plateau of the sawteeth of the auxiliary saw-toothed signal being offset with respect to a plateau of the sawteeth of the linear oscillator signal by a frequency f, obtaining, by modifying at least one of a duration of modulation of the sawteeth of the linear oscillator signal and a bandwidth dF of the linear oscillator signal, a beat at the frequency f between the sawteeth of the linear oscillator signal and the sawteeth of the auxiliary saw-toothed signal so that a processing device gives a measured height h'; and comparing the measured height h' with a standard height h obtained by computation according to a formula h=f*c*Td/(dF*2), in which is the speed of light.

2. The method according to claim 1, wherein a same frequency sweep is used for the sawteeth of the linear oscillator signal and for the sawteeth of the auxiliary saw-toothed signal.

3. The method according to claim 1, further comprising:

performing a test of sensitivity of the radio altimeter when the beat at the frequency f has been found, by suddenly reducing and then gradually increasing an amplitude of the auxiliary saw-toothed signal until the radio altimeter is again able to give the measured height h'.

4. The method according to claim 1, wherein a same period of modulation is used for the sawteeth of the linear oscillator signal and for the sawteeth of the auxiliary saw-toothed signal.

5. An FM/CW type radio altimeter comprising:

a control device;

a linear oscillator;

first coupling elements to couple the linear oscillator to a transmitting antenna;

a mixer circuit with a first input coupled to the linear oscillator, and a second input;

an auxiliary linear oscillator, the auxiliary oscillator being controlled by the control device;

a directional coupler to couple a receiving antenna and an output of the auxiliary linear oscillator to the second input of the mixer circuit; and a processing device to process output signals from the mixer circuit.

6. The radio altimeter according to claim 5, further comprising:

a variable attenuator interposed between the auxiliary linear oscillator and the directional coupler.

7. The method according to claim 2, wherein a same period of modulation is used for the sawteeth of the linear oscillator signal and for the sawteeth of the auxiliary saw-toothed signal.

8. The radio altimeter according to claim 5, wherein the auxiliary linear oscillator comprises an adjustable power oscillator configured to perform variable attenuation.

9. The radio altimeter according to claim 5, further comprising:

a first insulating amplifier and a first bandpass filter connected in series, the first insulating amplifier and the first bandpass filter interposed between the first coupling elements and the transmitting antenna.

10. The radio altimeter according to claim 5, further comprising:
  a power limiter, a second bandpass filter, and a second insulating amplifier connected in series, the power limiter, the second bandpass filter, and the second insulating amplifier interposed between the directional coupler and the mixer circuit.

11. The radio altimeter according to claim 5, wherein the processing device is comprised of a microprocessor.

12. The radio altimeter according to claim 10, wherein the directional coupler transmits a majority of energy received from the auxiliary linear oscillator to the power limiter.

* * * * *